(12) United States Patent
Barnett et al.

(10) Patent No.: US 9,342,998 B2
(45) Date of Patent: May 17, 2016

(54) TECHNIQUES TO ANNOTATE STREET VIEW IMAGES WITH CONTEXTUAL INFORMATION

(75) Inventors: Donald Barnett, Monroe, WA (US);
Tim Wantland, Redmond, WA (US);
Gonzalo Ramos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 77 days.

(21) Appl. No.: 12/947,578

(22) Filed: Nov. 16, 2010

(65) Prior Publication Data

US 2012/0124461 A1    May 17, 2012

(51) Int. Cl.
| | |
|---|---|
| *G06F 17/20* | (2006.01) |
| *G09B 29/00* | (2006.01) |
| *G06F 17/30* | (2006.01) |
| *G09B 29/10* | (2006.01) |

(52) U.S. Cl.
CPC ........ *G09B 29/007* (2013.01); *G06F 17/30047* (2013.01); *G06F 17/30241* (2013.01); *G09B 29/10* (2013.01)

(58) Field of Classification Search
CPC ............................ G06F 17/30; G06F 17/30047
USPC ................. 715/230, 256; 340/995.14, 995.24
See application file for complete search history.

(56) References Cited

U.S. PATENT DOCUMENTS

| | | | |
|---|---|---|---|
| 5,572,643 A | 11/1996 | Judson | |
| 5,812,134 A * | 9/1998 | Pooser | G06F 3/04815 707/999.102 |
| 6,157,933 A | 12/2000 | Celi, Jr. et al. | |
| 6,169,552 B1 | 1/2001 | Endo et al. | |
| 6,359,617 B1 * | 3/2002 | Xiong | G06T 3/0068 715/848 |

(Continued)

FOREIGN PATENT DOCUMENTS

| | | |
|---|---|---|
| CN | 101506764 | 10/2013 |
| EP | D802516 | 10/1997 |

(Continued)

OTHER PUBLICATIONS

"T-Mobile Motorola Cliq Phone", REtrieved at << http://www.alibaba.com/buyofferdetail/102889937/T_Mobile_Motorola_Cliq_Phone_.html >>, Jan. 1, 2010, pp. 1-3.

(Continued)

*Primary Examiner* — Mohammed-Ibrahim Zuberi
(74) *Attorney, Agent, or Firm* — Steven Spellman; Danielle Johnston-Holmes; Micky Minhas

(57) ABSTRACT

Techniques to annotate street level images with contextual information are described. A map application may comprise a street level component that when executed by a processor is operative to generate annotated street view images of a location. The street level component may comprise a street view component operative to generate a street view image from multiple street level images, the street view image having one or more objects located within the street view image. The street level component may further comprise a metadata component communicatively coupled to the street view component, the metadata component operative to generate a horizontal metadata panel having object metadata positioned in approximate vertical alignment with a corresponding object in the street view image, and combine the horizontal metadata panel with the street view image to form an annotated street view image. Other embodiments are described and claimed.

20 Claims, 9 Drawing Sheets

(56) References Cited

U.S. PATENT DOCUMENTS

| | | | |
|---|---|---|---|
| 6,430,501 | B1 | 8/2002 | Slominski |
| 6,434,265 | B1 * | 8/2002 | Xiong ................. G06K 9/32 382/154 |
| 7,096,233 | B2 | 8/2006 | Mori et al. |
| 7,284,187 | B1 | 10/2007 | Carboy |
| 7,548,814 | B2 | 6/2009 | Pantalone et al. |
| 7,843,451 | B2 * | 11/2010 | Lafon ................ G06T 15/205 345/423 |
| 7,894,984 | B2 * | 2/2011 | Rasmussen et al. ......... 701/452 |
| 8,060,582 | B2 * | 11/2011 | Bliss et al. .................. 709/218 |
| 8,378,808 | B1 * | 2/2013 | Gwaltney ............. G08B 25/14 340/286.05 |
| 2002/0047895 | A1 | 4/2002 | Bernardo et al. |
| 2005/0081247 | A1 * | 4/2005 | Lipsky et al. ................ 725/109 |
| 2006/0077461 | A1 * | 4/2006 | Camara et al. .............. 358/1.15 |
| 2006/0080286 | A1 | 4/2006 | Svendsen |
| 2006/0120624 | A1 * | 6/2006 | Jojic ................ G06F 17/30843 382/284 |
| 2006/0178813 | A1 * | 8/2006 | Chen ................. G01C 21/362 701/533 |
| 2006/0259585 | A1 * | 11/2006 | Keohane et al. ............. 709/219 |
| 2007/0076920 | A1 | 4/2007 | Ofek |
| 2007/0080830 | A1 * | 4/2007 | Sacks ......................... 340/995.1 |
| 2007/0159524 | A1 * | 7/2007 | Kim ..................... G06T 3/4038 348/36 |
| 2007/0171049 | A1 * | 7/2007 | Argasinski ....... G08B 13/19656 340/539.13 |
| 2008/0001967 | A1 * | 1/2008 | Rengarajan et al. ......... 345/629 |
| 2008/0043020 | A1 | 2/2008 | Snow et al. |
| 2008/0183383 | A1 | 7/2008 | Asai et al. |
| 2008/0291201 | A1 | 11/2008 | Lafon |
| 2008/0291217 | A1 * | 11/2008 | Vincent .................. G06T 17/05 345/629 |
| 2008/0292213 | A1 * | 11/2008 | Chau ............................ 382/294 |
| 2009/0055087 | A1 | 2/2009 | Beacher |
| 2009/0079830 | A1 | 3/2009 | Ekpar |
| 2009/0113296 | A1 | 4/2009 | Lacy |
| 2009/0153474 | A1 * | 6/2009 | Quennesson ................ 345/157 |
| 2009/0164113 | A1 | 6/2009 | Kang |
| 2009/0190857 | A1 * | 7/2009 | Epshtein et al. ............. 382/276 |
| 2009/0216434 | A1 | 8/2009 | Panganiban |
| 2009/0265103 | A1 * | 10/2009 | Kostepen ............ G06F 17/3087 701/469 |
| 2009/0303231 | A1 | 12/2009 | Robinet et al. |
| 2010/0012737 | A1 | 1/2010 | Kates |
| 2010/0045703 | A1 | 2/2010 | Kornmann et al. |
| 2010/0046842 | A1 * | 2/2010 | Conwell ........... G06F 17/30265 382/218 |
| 2010/0094548 | A1 | 4/2010 | Tadman et al. |
| 2010/0123737 | A1 | 5/2010 | Williamson et al. |
| 2010/0125407 | A1 * | 5/2010 | Cho et al. ..................... 701/201 |
| 2010/0136957 | A1 * | 6/2010 | Horodezky et al. ........ 455/414.2 |
| 2010/0171691 | A1 * | 7/2010 | Cook et al. ................... 345/156 |
| 2010/0215250 | A1 | 8/2010 | Zhu |
| 2011/0004341 | A1 * | 1/2011 | Sarvadevabhatla .... B25J 9/1602 700/250 |
| 2011/0098917 | A1 * | 4/2011 | LeBeau et al. ............... 701/201 |
| 2011/0302527 | A1 * | 12/2011 | Chen et al. ................... 715/800 |
| 2012/0019513 | A1 * | 1/2012 | Fong et al. .................... 345/419 |
| 2012/0299920 | A1 * | 11/2012 | Coombe ................ G06T 19/00 345/423 |
| 2014/0108939 | A1 * | 4/2014 | Mahapatra ............ G06Q 30/06 715/738 |

FOREIGN PATENT DOCUMENTS

| | | |
|---|---|---|
| EP | 1526360 A1 | 4/2005 |
| EP | 2194508 A1 | 6/2010 |
| JP | H09281889 | 10/1997 |
| JP | H113032 | 1/1999 |
| JP | 2002213984 | 7/2002 |
| JP | 2002098541 | 4/2004 |
| JP | 2004280250 | 10/2004 |
| JP | 2004350006 | 12/2004 |
| JP | 2009289033 | 12/2009 |
| JP | 2010531007 | 9/2010 |
| TW | 200415493 A | 8/2004 |
| TW | 200415493 A * | 8/2004 |
| TW | 201039156 A * | 11/2010 |
| TW | 201039156 A | 11/2010 |
| WO | 2008147561 A1 | 12/2008 |
| WO | 2011059777 | 5/2011 |

OTHER PUBLICATIONS

Johnson, et al., "Palm Pre Gesture Guide—How to use Gestures to Control Zoom, Drag and Drop, Highlight, and other Features", Retrieved at << http://www.brighthub.com/mobile/palm/articles/41625.aspx >>, Jan. 20, 2010, pp. 1-3.

Park, Will., "Google Maps Update works with HTC HD2's Digital Compass", Retrieved at << http://www.intomobile.com/2009/12/09/google-maps-update-works-with-htc-hd2s-digital-compass.html >>, Dec. 9, 2009, pp. 1-5.

"T-Mobile G1 (black) Smartphone Reviews—CNET Reviews", Retrieved at << http://reviews.cnet.com/smartphones/t-mobile-g1-black/4505-6452_7-33283585.html >>, Editor: Kent German, Oct. 22, 2008, pp. 1-6.

Kargl, et al., "The iNAV Indoor Navigation System", Retrieved at << http://medien.informatik.uni-ulm.de/forschung/publikationen/ucs2007.pdf >>, vol. 4836, 2010, pp. 8.

Lazem, et al., "Prediction-Based Prefetching for Remote Rendering Streaming in Mobile Virtual Environments", Retrieved at << http://eprints.cs.vt.edu/archive/00000984/01/PredictionPrefetch-TR.pdf >>, Dec. 15-18, 2007, pp. 1-10.

"International Search Report", Mailed Date: May 22, 2012, Application No. PCT/US2011/058632, Filed Date: Oct. 31, 2011, pp. 12.

Office Action received for Chinese Patent Application No. 201110363011.2, mailed May 5, 2014, 13 pages including 5 pages English translation.

"Second Office Action Received in China Patent Application No. 201110363011.2", Mailed Date: Oct. 28, 2013, 4 Pages.

Gonzalez, Nick, "Google Maps Now with 360 Streetside Views", http://techcrunch.com/2007/05/29/google-maps-now-with-360-streetside-views, Published May 29, 2007, 13 pages.

Kopf, Johannes et al., "Street Slide: Browsing Street Level Imagery", http://research.microsoft.com/en-us/um/people/kopf/street_slide/index.html, retrieved on Aug. 30, 2010, 2 pages.

Krug, Jarrod, "Street-Level Imagery Comes to MapQuest.com as 360 View", http://blog.mapquest.com/2009/12/11/street-level-imagery-comes-to-mapquest-com-as-360-view/, Published Dec. 11, 2009, 9 pages.

"StreetView Fun", http://www.streetviewfun.com/, Published Aug. 30, 2010, 4 pages.

"Office Action and Search Report Issued in Taiwan Patent Application No. 100137402", Mailed Date: Dec. 10, 2015, 11 Pages.

"Office Action Issued in Russian Patent Application No. 2013122464", Mailed Date: Oct. 27, 2015, 6 Pages. (W/o English Translation).

Search Report Issued in European Application No. 11840719.6 mailed Feb. 19, 2016, 8 pages.

Chinese First Office Action in Application 201110363011.2 mailed Mar. 5, 2013, 10 pages.

Chinese Fourth Office Action in Application 201110363011.2 mailed Nov. 15, 2014, 6 pages.

Chinese Notice of Allowance in Application 201110363011.2 mailed Jan. 20, 2016, 4 pages.

Chinese Fifth Office Action in Application 201110363011.2 mailed Jul. 15, 2015, 6 pages.

Japanese Office Action in Application 2013539861, mailed Nov. 24, 2015, 11 pages.

* cited by examiner

600

- GENERATE A STREET VIEW IMAGE FOR A MAP APPLICATION
  602

- GENERATE A HORIZONTAL METADATA PANEL FOR THE STREET VIEW IMAGE
  604

- RETRIEVE OBJECT METADATA FOR OBJECTS SHOWN IN THE STREET VIEW IMAGE
  606

- POSITION OBJECT METADATA IN THE HORIZONTAL METADATA PANEL IN APPROXIMATE VERTICAL ALIGNMENT WITH A CORRESPONDING OBJECT IN THE STREET VIEW IMAGE
  608

- COMBINE THE STREET VIEW IMAGE AND THE HORIZONTAL METADATA PANEL TO FORM AN ANNOTATED STREET VIEW IMAGE
  608

TECHNIQUES TO ANNOTATE STREET VIEW IMAGES WITH CONTEXTUAL INFORMATION

BACKGROUND

Online mapping applications are a valuable tool used frequently by many. Various alternative presentations such as satellite view, orthographic map, and comparable versions are provided by different hosted services. Some of those variations may even be superimposed. A recent development in online mapping services is street view, which enables users to view the surroundings of a particular location at the street level. In many applications, a default street level view of a given address is displayed upon receiving the address from the user. The user may then be enabled to rotate the viewing angle by selecting a rotation control. However, many street view applications typically present a limited view of the location as captured from a mobile imaging unit (e.g. one or few buildings at a time). As such, a viewer may not have sufficient contextual information to utilize street view images in a useful manner. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to annotate images generated by a mapping application. Some embodiments are particularly directed to enhanced techniques for annotating street view images with contextual information. In one embodiment, for example, an apparatus may comprise a processor and a memory coupled to the processor. The memory may store a map application having a street level component that when executed by the processor is operative to generate annotated street view images of a location. The street level component may comprise, among other elements, a street view component and a metadata component. The street view component may be operative to generate a street view image from multiple street level images, the street view image having one or more objects located within the street view image. The metadata component may be operative to generate a horizontal metadata panel having object metadata positioned in approximate vertical alignment with a corresponding object in the street view image, and combine the horizontal metadata panel with the street view image to form an annotated street view image. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 6 illustrates an embodiment of a logic flow.

DETAILED DESCRIPTION

Figure 1:
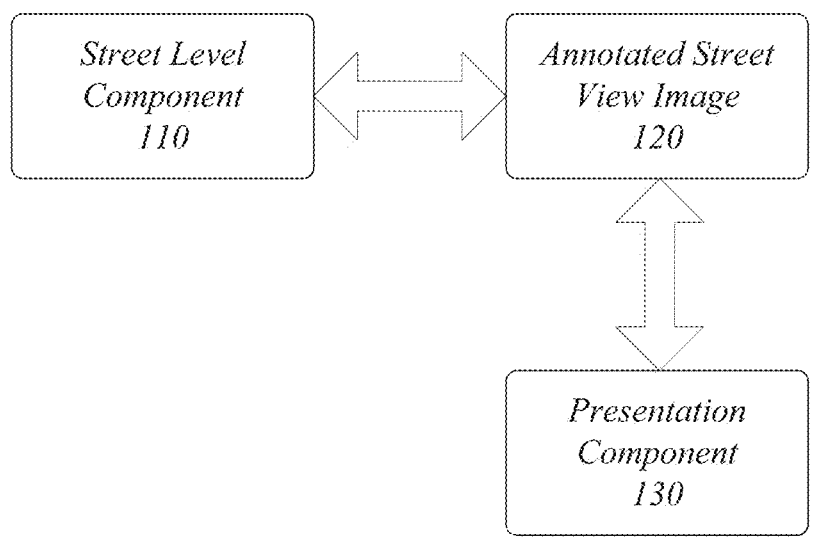
FIG. 1 illustrates an embodiment of a mapping application.

Various embodiments are directed to enhanced techniques for annotating street view images with contextual information. More particularly, embodiments may generate user interface elements capable of presenting contextual information for street view images to a viewer in a natural and easily understood manner. This allows a viewer to more quickly determine whether a location is of interest and gather more information related to the location.

Conventional street view applications are limited in several respects. Street view applications enable users to view the surroundings of a particular location at a street level, sometimes referred to as a street view image. A user may rotate a viewing angle for a street view image using various navigation tools, such as by manipulating a rotation control. Many street view applications present a limited view of the location as captured from a mobile imaging unit (e.g. one or few buildings at a time). As such, a viewer may not have sufficient contextual information to utilize street view images in a useful manner. Further, current immersive-views of street side imagery do not permit a clear view of the surrounding elements along a street, pin the viewer to the ground and only permit jumps between discrete points along a trajectory, and present a view along a street from a vehicle point of view as opposed to sliding through a block from a pedestrian point of view. In addition, some mapping applications provide more detailed information about specific addresses such as business names though user interface elements like balloons and hovering display boxes superimposed on a regular map or satellite view. While useful, such information is commonly not provided on a street view presentation. In addition, street view presentations typically switch views when navigating corners, thereby causing a momentary loss in context by a viewer.

Embodiments attempt to solve these and other problems by generating enhanced user interface elements capable of presenting contextual information for street view images to a viewer. A mapping application may implement, or coordinate with, a street level component arranged to generate annotated street view images of a location selected by a user. A location may be selected, for example, by entering a street address into a user interface for the mapping application. The street level component may comprise a street view component arranged to generate a street view image from multiple street level images. The street view image may have one or more objects located within the street view image, such as a building, streets, people, cars, and so forth. A metadata component may be arranged to generate contextual information for various objects located within the street view image. For instance, the metadata component may generate a horizontal metadata panel having contextual information corresponding to various objects in the street view image. The horizontal metadata panel may be positioned above or below the street view image. The contextual information for the horizontal metadata panel may include various types of object metadata positioned in approximate vertical alignment with a corresponding object in the street view image. This vertical alignment allows a viewer to quickly associate a given set of object metadata with a corresponding object in the street view image. The metadata component may then combine the horizontal metadata panel with the street view image to form an annotated street view image. The annotated street view image may be delivered to a client device for presentation on a display via a web browser or client mapping application.

FIG. 1 illustrates a block diagram for a mapping application 100. In one embodiment, for example, the mapping application 100 may comprise a computer-implemented mapping application 100 having multiple components 110, 130. As used herein the terms "system" and "component" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the mapping application 100 may be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a gaming device, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. Although the mapping application 100 as shown in FIG. 1 has a limited number of elements in a certain topology, it may be appreciated that the mapping application 100 may include more or less elements in alternate topologies as desired for a given implementation.

The components 110, 130 may be communicatively coupled via various types of communications media. The components 110, 130 may coordinate operations between each other. The coordination may involve the uni-directional or bi-directional exchange of information. For instance, the components 110, 130 may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The mapping application 100 may be generally arranged to provide various online and offline mapping applications and services for generating, delivering and navigating digital maps representing various geographic and physical locations. The mapping application 100 may be particularly arranged to provide a street view and user interface techniques for navigating the street view. Examples for the mapping application 100 may include without limitation a mapping application provided by MICROSOFT® BING® Maps, GOOGLE® Maps, YAHOO® Maps, and so forth. The embodiments are not limited in this context.

In various embodiments, the mapping application 100 may be executed on any computing device or platform, such as a server. Throughout this specification, the term "platform" may be a combination of software and hardware components for managing mapping operations in conjunction with client devices, such as a personal computer or mobile device. Examples of platforms include, but are not limited to, a hosted service or "cloud computing service" executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. Additionally or alternatively, the mapping application 100 may be executed on mobile devices such as smart phones, handheld computers, wireless Personal Digital Assistants (PDAs), mapping application enabled cellular phones, vehicle mount computing devices and other electronic devices providing a suitable environment for the mapping application 100 as previously described. The embodiments are not limited in this context.

In the illustrated embodiment shown in FIG. 1, the mapping application 100 may implement, or coordinate with, a street level component 110. The street level component 110 may be generally arranged to perform various online mapping operations, including generating one or more annotated street view images 120 of a location. The location may be defined based on user input or automatic determination of the location based on Global Positioning Service (GPS) information, cellular tower triangulation, wireless data network node detection, and similar techniques. A user may select a given location, for example, by entering a street address into a user interface for the mapping application 100, selecting a position on a map provided by the mapping application 100, or selecting a user interface element representing a given location provided by the mapping application 100, among other techniques.

An annotated street view image 120 may include various street level views of surrounding for a given location. The annotated street view image 120 may comprise a two-dimensional (2D) or three-dimensional (3D) street level view of a defined location. An annotated street view image 120 may include up to a 360° panoramic street level view of the surroundings of a defined location. In one embodiment, for example, an annotated street view image 120 may comprise a 2D street level view from a perspective of a user positioned in a street looking towards one side of a street. The street level view may include various physical objects, including people, animals, buildings, cars, business signs, street signs, fire hydrants, and so forth. A user may navigate or manipulate an annotated street view image 120 using various street view navigation techniques provided by the street level component 110, such as moving an annotated street view image 120 up or down a street, switching from one side of a street to another side of the street, looking up or down a street, and so forth.

In addition to normal objects typically found in a street level view, an annotated street view image 120 may be annotated with various types of object metadata concerning certain objects captured within the annotated street view image 120. Object metadata may comprise different types of information about a captured object. Examples of object metadata may be described in more detail with reference to FIG. 2.

In the illustrated embodiment shown in FIG. 1, the mapping application 100 may implement, or coordinate with, a presentation component 130. The presentation component 130 may render or present an annotated street view image 120 on an electronic device. In one embodiment, for example, the presentation component 130 may interoperate with another application for presenting an annotated street view image 120, such as an operating system, web browser, a client application, or a client-based version of the mapping application 100. The presentation component 130 may also provide various user interfaces for the mapping application 100.

The presentation component 130 may provide a user interface for implementing various street view navigation techniques. In one embodiment, for example, the presentation component 130 may provide street view navigation techniques on a mobile device with touch-enabled display. The presentation component 130 may implement user interface techniques for navigating in a street view map using gesture-based techniques and hardware-input techniques. Gesture-based techniques may be specified by providing input gestures through a touch-enabled display of touch-sensitive input device on the mobile device in a single or multi-touch manner. While many gestures may be implemented a few example ones include a single up-down gesture to perform a u-turn, a double-finger split up-down motions for revealing two sides of a street, dragging in a turn arc to move down cross streets, and any other number of gesture-based techniques. Other navigation techniques may take advantage of hardware input, such as an accelerometer, a compass, and/or a trackball. Examples of such techniques may include tilting a mobile phone to one side to slide up and down the street, tilting the mobile phone up or down to see a top down map, and similar ones. As a user brings a mobile device to a horizontal position (e.g., looking toward the ground in the 360° display), the displayed street view may fade, transition or animate into a top map view that displays the area around the currently displayed location. Further hardware-based inputs may include rotating a mobile device about the vertical axis to see another side of a street, rotating the mobile device to slide the viewer along the street, and comparable ones (e.g., employing the accelerometer of the mobile device). Additional input may be received from an integrated camera that sees the user. For example, a display may be moved based on the user's head motion to generate a motion parallel to the user's head motion to see a different portion of the street.

Figure 2:
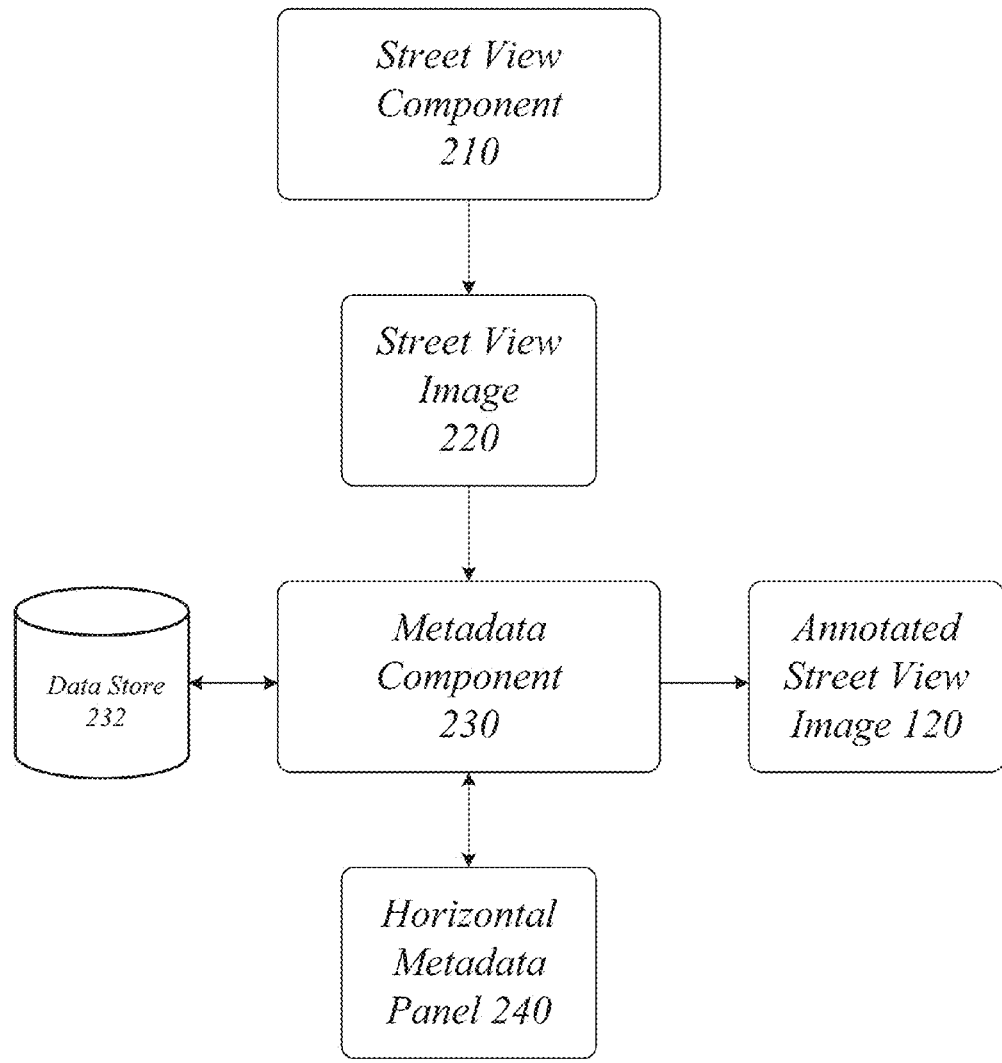
FIG. 2 illustrates an embodiment of a street view component.

FIG. 2 illustrates a more detailed block diagram of the street level component 110. In the illustrated embodiment shown in FIG. 2, the street level component 110 may comprise a street view component 210, a street view image 220, a metadata component 230, a data store 232, and a horizontal metadata panel 240. It may be appreciated that the street level component 110 may include more or less elements as desired for a given implementation.

The street view component 210 may be generally arranged to generate one or more street view images 220 for a location formed from one or more street level images for the street level component 110 of the mapping application 100. Each street view image 220 may have one or more objects located within the street view image, such as a building, streets, people, cars, and so forth. A location may be defined based on user input or automatic determination. In the former case, for example, the presentation component 130 may generate a user interface with a text box allowing a user to select a location for the mapping application 100. In the latter case, for example, the street view component 210 may automatically retrieve location information from a GPS device, cellular tower triangulation, wireless data network node detection, or similar location detection techniques.

In either case, the street view component 210 receives a request for a street level view of a defined location. The street view component 210 may retrieve one or more street level images for the location from a map database. For instance, each street level image may comprise a portion or "tile" within a complete street view image 220. The street view component 210 may combine or "stitch" the one or more street level images together to form a street view image 220.

In one embodiment, the mapping application 100 may be implemented as part of a server. In this case, the street view component 210 may receive a request for a street level view of a defined location at the server from a client device, such as a personal computer or a mobile device, for example. The client devices typically communicate with servers providing mapping data, images, and other data via wired or wireless networks, such as various cellular networks, local area networks, wide area networks, and comparable ones. Characteristics such as bandwidth and processing power may vary considerably depending on a type of network, location of a client device, network load or usage, and similar factors. Thus, retrieval of mapping data, especially street view images, is potentially subject to delays based on network conditions. Further, network latency based on receipt of a request from a client device, queuing and processing by a server, and transmittal of the response adds additional delay regardless of network conditions. In some cases, the roundtrip latency for a mobile device may be up to 0.25 seconds.

Some embodiments may implement techniques to optimize image requests and mitigate delays through various visual presentation techniques in order to improve user experience. According to some embodiments, network delays in retrieval of street view images may be mitigated by providing temporary supplemental views of the location. According to other embodiments, image requests may be scheduled or streamed to streamline the retrieval instead of, or in addition to, supplemental temporary views. Panoramic views of a street view map may be represented with a tiled pyramid scheme, so that only those parts visible on the screen are downloaded. The pyramid levels may contain lower resolution versions of the highest resolution image. Alternatively, instead of storing low resolution copies, semantically rich copies of the information may be stored while maintaining highest rendering quality. For example, at the lowest level of the pyramid, instead of storing a low resolution image, textual annotation of the nearby buildings may be stored. That way, the user may first see the annotations and text (e.g. no imagery or simple graphics). The text may be rendered at high fidelity with no loss of resolution. The text itself is more compact than even storing a low resolution image, and may be downloaded quickly. Yet another approach for optimizing the rendering of street view maps despite network-based delays may include non-homogenic scaling, where an object of interest (e.g. a building or a business sign) may be displayed at a relatively high resolution, while other objects (trees, repeating windows, fences, etc.) are displayed with a scaled-down resolution. Thus, valuable bandwidth may be used for the important objects rather than using a fixed resolution for the entire street view. An additional approach for bandwidth saving may include shrinking "uninteresting" parts of the street images, such as empty spaces between houses, repeating patterns (such as showing only a few columns of a house, to show its nature, but not its full width). The resulting images may have a majority of the view information at smaller number of pixels, which is also better displayed on a limited size phone screen. It may be appreciated that these are merely a few examples of visual presentation techniques suitable for a given implementation, and other visual presentation techniques may be used as well. The embodiments are not limited in this context.

For a given street view image 220, the metadata component 230 may be generally arranged to generate contextual information for various objects located within the street view image 220. For instance, the metadata component 230 may generate a horizontal metadata panel 240 having contextual information corresponding to various objects in a street view image 220. Contextual information may include object metadata stored by the datastore 232.

The datastore 232 may comprise a database storing information for the mapping application 100. The data store 232 may comprise a local datastore implemented on a same device as the mapping application 100, or a remote datastore implemented on a different device from a device executing the mapping application 100.

In one embodiment, the datastore 232 may comprise a database storing object metadata suitable for providing contextual information for the street view image 220. Object metadata may comprise any type of data or information capable of association with one or more corresponding objects in a street view image 220. Examples of object metadata may include without limitation location information, business information, personal information, event information, social networking system (SNS) information, advertising information, navigation information, documents (e.g., word processing, spreadsheet, presentation, notes, calendar, etc.), media files (e.g., photos, audio files, video files, audio/video files, etc.), application files (e.g., contact information, calendar information, tasks, etc.), weather information, temperature information, traffic condition information, offers and coupons, proximal devices, people, beacons, and so forth. Examples for location information may include information associated with a given location, including without limitation a location name, a street address, a building name, a building address, map coordinates, GPS coordinates, and so forth. Examples for business information may include information associated with a given business located at a given location, including without limitation a business name, a business description, business contact information (e.g., telephone number, email address, domain name, etc.). Examples for personal information may include information associated with a given person located at a given location, including without limitation a personal name, contact information (e.g., telephone number, mobile number, email address, presence information, etc.), age, sex, race, and other descriptive characteristics. Examples for event information may include information associated with a given event at a given location, including without limitation an event name (e.g., a holiday party), event description, event start time, event end time, and so forth. Examples for SNS information may include information associated with a given SNS at a given location, including without limitation a SNS name, a SNS screen name, a SNS status, a SNS newsfeed, and so forth. Examples of an SNS may include without limitation MICROSOFT® WINDOWS LIVE®, MYSPACE®, FACEBOOK®, LINKEDIN®, TWITTER®, BEBO® and other social networking systems and services consistent with the described embodiments. Examples for advertising information may include information associated with a given person, place or business at a given location, including without limitation personal advertisements, business advertisements, event advertisements, location advertisements, still advertisements, animated advertisements, multimedia advertisements, and so forth. Examples for navigation information may include information associated navigating around a given location, including without limitation street signs, street numbers, turning arrows, navigation signs, navigation symbols, still signs, animated signs, multimedia signs, and so forth. It may be appreciated that these are merely a few examples of object metadata suitable for a given street view image 220, and other types of object metadata may be used as well. The embodiments are not limited in this context.

The metadata component 230 may generate a horizontal metadata panel 240 for the street view image 220. A horizontal metadata panel 240 may comprise a user interface element designed to store and present object metadata for a corresponding street view image 220. More particularly, a horizontal metadata panel 240 may comprise a user interface element specifically designed to store and present object metadata for a corresponding street view image 220 along a horizontal axis of an electronic display, as compared to a vertical metadata panel (not shown) designed to store and present object metadata along a vertical axis of an electronic display.

When constructed along a horizontal axis for an electronic display, a horizontal metadata panel 240 may be positioned either above or below a street view image 220. In one embodiment, the metadata component 230 may generate a top horizontal metadata panel for a street view image 220. A top horizontal metadata panel may be positioned above a top portion of a street view image 220. In one embodiment, the metadata component 230 may generate a bottom horizontal metadata panel for a street view image 220. A bottom horizontal metadata panel may be positioned below a bottom portion of a street view image 220. Respective top and bottom horizontal metadata panels may be illustrated and described further with reference to FIGS. 5A, 5B.

A horizontal metadata panel 240 may have any size, shape, dimension, or geometry suitable for a given implementation. In one embodiment, a horizontal metadata panel 240 may have approximate rectangular dimensions having a smaller height and similar width as a corresponding street view image 220. This matches a given dimension for a street view image 220 as presented on a typical square or rectangular electronic display. However, a horizontal metadata panel 240 may have different dimensions based such factors as a given street view image 220, objects within a given street view image 220, an electronic display, a given type of object metadata (e.g., text, image, graphic, animation, video, etc.), formatting characteristics of object metadata (e.g., font, font size, bold, italics, line spacing, etc.), presentation characteristics (e.g., colors, shading, opacity, etc.), an amount of object metadata (e.g., 1-line, 2-lines, 3-lines . . . n-lines), and so forth. The embodiments are not limited in this context.

A horizontal metadata panel 240 may also be displayed and/or presented as a different plane in perspective. For instance, rather than remaining a same plane as a street view image 220, the horizontal metadata panel 240 may be presented on a different plane as the street view image 220. In some cases, the horizontal metadata panel 240 may be formed in a different plane parallel to (e.g., above or below) a plane. In other cases, the horizontal metadata panel 240 may be formed in a different plane perpendicular (or some other angle) to a plane for the street view image 220, such as a wall or plane viewed in perspective. The embodiments are not limited in this context.

The metadata component 230 may position various types of object metadata in a horizontal metadata panel 240 in approximate vertical alignment with a corresponding object in a street view image 220. This vertical alignment allows a viewer to more quickly associate a given set of object metadata with a corresponding object in a street view image 220, as described in more detail with reference to FIGS. 5A, 5B.

Once a street view image 220 and a horizontal metadata panel 240 for the street view image 220 has been generated, the metadata component 230 may combine the horizontal metadata panel 240 with the street view image 220 to form an annotated street view image 120.

In one embodiment, the metadata component 230 may generate and position a horizontal metadata panel 240 adjacent to a street view image 220. In this case, an edge of a horizontal metadata panel 240 may be near or proximate to an edge of a street view image 220, without the edges touching each other.

In one embodiment, the metadata component 230 may generate and position a horizontal metadata panel 240 adjoining or contiguous with a street view image 220. In this case, an edge of a horizontal metadata panel 240 may be actually touching an edge of a street view image 220.

In one embodiment, the metadata component 230 may generate and position a horizontal metadata panel 240 overlapping with a street view image 220. In this case, an edge of a horizontal metadata panel 240 may be over by some distance an edge of a street view image 220, or vice-versa.

In addition to the metadata component 230 generating and positioning object metadata within a horizontal metadata panel 240, the metadata component 230 may also position object metadata within a street view image 220. In one embodiment, for example, the metadata component 230 may position object metadata comprising navigation information in a street view image 220 proximate to a corresponding object in the street view image 220.

Once generated, an annotated street view image 120 may be sent to a client device over a network for presentation on a display of the client device via a web browser or client mapping application.

Figure 3:
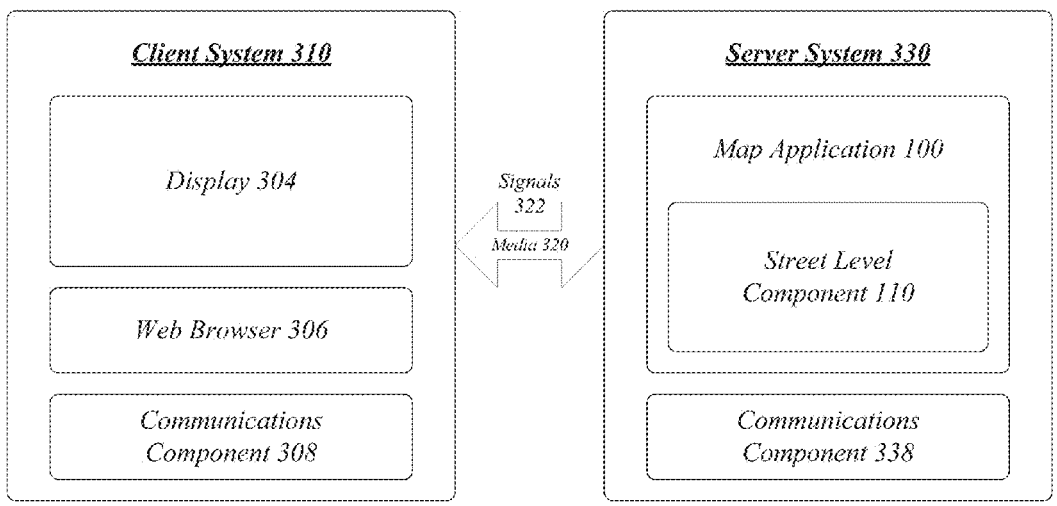
FIG. 3 illustrates an embodiment of a first distributed system.

FIG. 3 illustrates a block diagram of a distributed system 300. The distributed system 300 may distribute portions of the structure and/or operations for the mapping application 100 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, for example, the distributed system 300 may be implemented as a client-server system. A client system 310 may implement a display 304, a web browser 306, and a communications component 308. A server system 330 may implement some or all of the mapping application 100, such as the street level component 110, and a communications component 338. Although the distributed system 300 as shown in FIG. 3 has a limited number of elements in a certain topology, it may be appreciated that the distributed system 300 may include more or less elements in alternate topologies as desired for a given implementation.

The client system 310 may comprise or employ one or more client computing devices and/or client programs that operate to perform various client operations in accordance with the described embodiments. Examples of the client system 310 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, gaming devices, television, digital television, set top box, wireless access point, base station, subscriber station, mobile subscriber center, radio network controller, router, hub, gateway, bridge, switch, machine, or combination thereof.

In various embodiments, the server system 330 may comprise or employ one or more server computing devices and/or server programs that operate to perform various server operations in accordance with the described embodiments. For example, when installed and/or deployed, a server program may support one or more server roles of the server computing device for providing certain services and features. Exemplary server systems 330 may include, for example, stand-alone and enterprise-class server computers operating a server operating system (OS) such as a MICROSOFT OS, a UNIX® OS, a LINUX® OS, or other suitable server-based OS. Exemplary server programs may include, for example, communications server programs such as MICROSOFT WINDOWS LIVE® or MICROSOFT OFFICE COMMUNICATIONS SERVER (OCS) for managing incoming and outgoing messages, messaging server programs such as MICROSOFT EXCHANGE SERVER for providing unified messaging (UM) for e-mail, voicemail, VoIP, instant messaging (IM), group IM, enhanced presence, and audio-video conferencing, and/or other types of programs, applications, or services in accordance with the described embodiments.

The client system 310 and the server system 330 may communicate with each over a communications media 320 using communications signals 322. In one embodiment, for example, the communications media may comprise a public or private network. In one embodiment, for example, the communications signals 322 may comprise wired or wireless signals. Computing aspects of the client system 310 and the server system 330 may be described in more detail with reference to FIG. 7. Communications aspects for the distributed system 300 may be described in more detail with reference to FIG. 8.

The distributed system 300 illustrates an example where the client system 310 implements input and output devices for the mapping application 100, while the server system 330 implements the mapping application 100 to perform online mapping operations. In one embodiment, for example, the mapping application 100 may be implemented as a web application or web service accessible via the web browser 306. For instance, a user may utilize the web browser 306 of the client system 310 to request and view annotated street view images 120 as provided by the mapping application 100 implemented by the server system 330. Examples of suitable web browsers may include MICROSOFT INTERNET EXPLORER®, GOOGLE® CHROME and APPLE® SAFARI, to name just a few. The server system 330 may send annotated street view images 120 from the communications component 338 as communications signals 322 over the communications media 320 to the communications component 308 of the client system 310. The client system 310 may receive the annotated street view images 120, and present the annotated street view images 120 on the display 304 of the client system 310.

Figure 4:
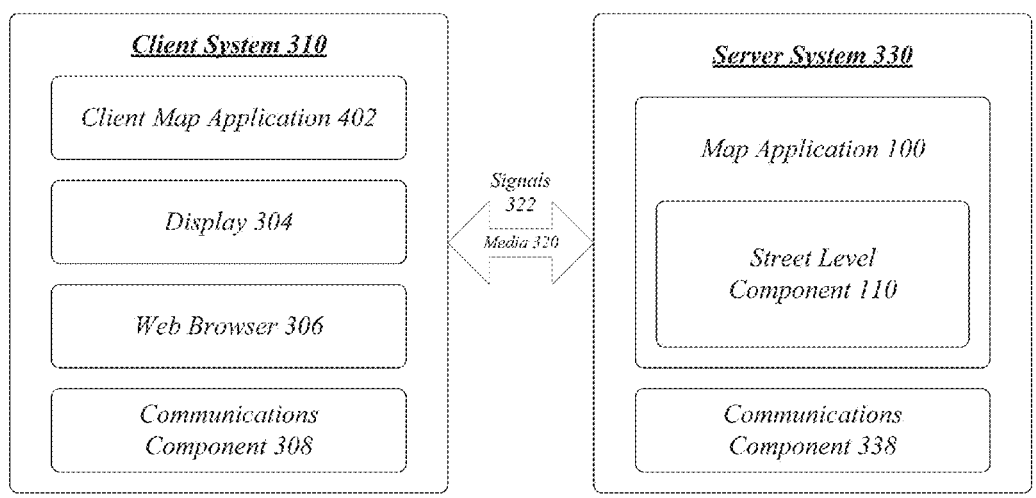
FIG. 4 illustrates an embodiment of a second distributed system.

FIG. 4 illustrates a block diagram of a distributed system 400. The distributed system 400 may be similar to the distributed system 300 as described with reference to FIG. 3. However, the client system 310 may further include a client map application 402. The client map application 402 may be designed as a stand-alone mapping application for execution in an offline mode, or to interoperate with the mapping application 100 in an online mode, or a combination of both. For instance, the client map application 402 may operate similar to the mapping application 100, and perform mapping operations with map information and object metadata stored on the client system 310 when in an offline mode, and use map information and object metadata stored on the server system 330 when in an online mode. Additionally or alternatively, the client map application 402 may perform some of the mapping operations while the mapping application 100 performs other mapping operations. For instance, the client map application 402 may implement the presentation component 130 while the mapping application 100 implements the street level component 110.

Figure 5A:
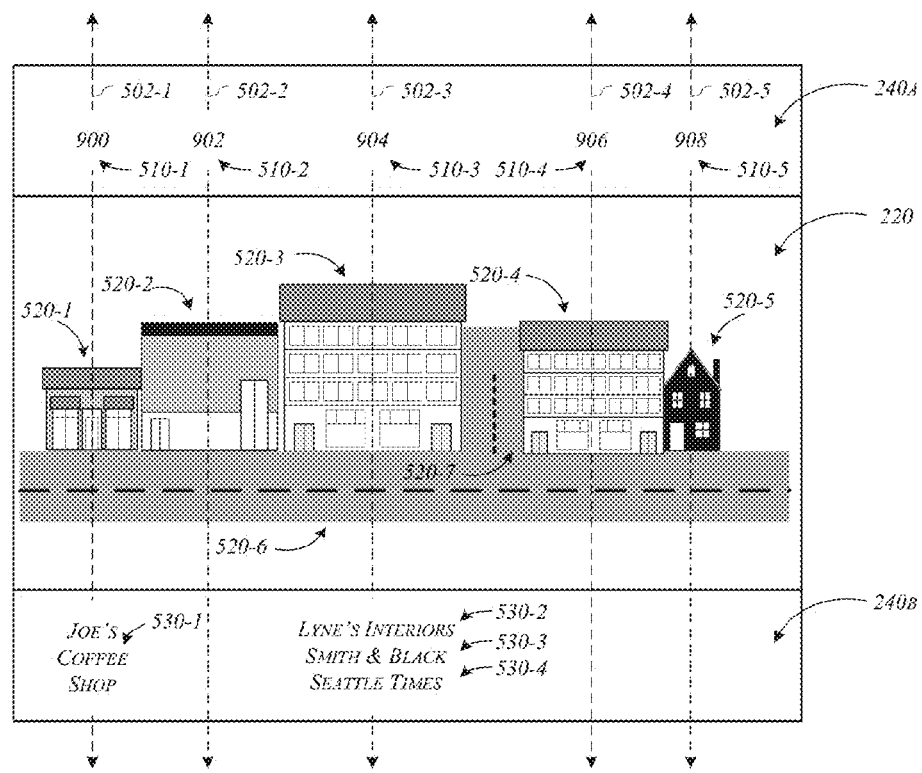
FIG. 5A illustrates an embodiment of a first street view image.

FIG. 5A illustrates an exemplary annotated street view image 120A. In the illustrated embodiment shown in FIG. 5A, the annotated street view image 120A may comprise various parts, including a top horizontal metadata panel 240A, a street view image 220, and a bottom horizontal metadata panel 240B.

Assume the mapping application 100 of the server system 330 receives a request for a street level view of a location from the client system 310 via the web browser 306 or the client map application 402. The street view component 210 of the street level component 110 may retrieve multiple street level images for the location from a map database, such as the datastore 232. The street view component 210 may combine some number of the street level images (e.g., based on a size of the display 304) to form a street view image 220.

The street view image 220 may include various objects 520-$a$ within the street view image 220. For instance, the street view image 220 may include a first building 520-1, a second building 520-2, a third building 520-3, a fourth building 520-4, and a fifth building 520-5. Further, the street view image 220 may include a first street 520-6 and a second street 520-7. As show, the streets 520-6, 520-7 are intersecting streets.

It is worthy to note that "a" and "b" and "c" and similar designators as used herein are intended to be variables representing any positive integer. Thus, for example, if an implementation sets a value for a=5, then a complete set of objects 520-$a$ may include objects 520-1, 520-2, 520-3, 520-4 and 520-5. The embodiments are not limited in this context.

Once the street view image 220 is generated, the metadata component 230 may generate the horizontal metadata panels 240A, 240B. When constructed along a horizontal axis for an electronic display, such as the display 304 of the client system 310, a horizontal metadata panel 240 may be positioned above and below the street view image 220. In one embodiment, the metadata component 230 may generate a top horizontal metadata panel 240A for a street view image 220. A top horizontal metadata panel 240A may be positioned above a top portion of a street view image 220. In one embodiment, the metadata component 230 may generate a bottom horizontal metadata panel 240B for a street view image 220. A bottom horizontal metadata panel 240B may be positioned below a bottom portion of a street view image 220.

The metadata component 230 may generate the horizontal metadata panels 240A, 240B with various types of object metadata 510-$b$, 530-$c$ corresponding to various objects 520-$a$ included within the street view image 220. For instance, the top horizontal metadata panel 240A may include various object metadata 510-1 through 510-5 comprising street numbers "900," "902," "904," "906" and "908" each corresponding to the respective buildings 520-1, 520-2, 520-3, 520-4 and 520-5. Further, the bottom horizontal metadata panel 240B may include various object metadata 530-1, 530-2 comprising business information such as for businesses located at the various objects 520-$a$. For instance, the bottom horizontal metadata panel 240B may include the object metadata 530-1 comprising a business name "Joe's Coffee Shop" located at building 520-1, and the object metadata 530-2, 530-3 and 530-4 comprising business names "Lyne's Interiors," "Smith & Black," and "Seattle Times," all located at the building 520-3.

The metadata component 230 may position various types of object metadata in the horizontal metadata panels 240A, 240B in approximate vertical alignment along axes 502-$d$ with a corresponding object 520-$a$ in the street view image 220. This vertical alignment allows a viewer to more quickly associate a given set of object metadata 510-$b$, 530-$c$ with a corresponding object 520-$a$ in the street view image 220. For instance, the metadata component 230 may position the object metadata 510-1, 510-2, 510-3, 510-4 and 510-5 along respective vertical axes 502-1, 502-2, 502-3, 502-4 and 502-5. This vertical alignment along vertical axis 502-1 allows a viewer to more quickly associate the object metadata 510-1 of "900" in the top horizontal metadata panel 240A with the building 520-1 in the street view image 220, since a viewer may easily scan down from the object metadata 510-1 along the vertical axis 502-1 to find the corresponding 520-1 in a vertical direction without a need for scanning across other portions of the street view image 220 in a horizontal direction. Similarly, the vertical alignment along vertical axis 502-1 allows a viewer to more quickly associate the object metadata 530-1 of "Joe's Coffee Shop" in the bottom horizontal metadata panel 240B with the building 520-1 in the street view image 220, since a viewer may easily scan up from the object metadata 530-1 along the vertical axis 502-1 to find the corresponding 520-1 in a vertical direction without a need for scanning across other portions of the street view image 220 in a horizontal direction.

Figure 5B:
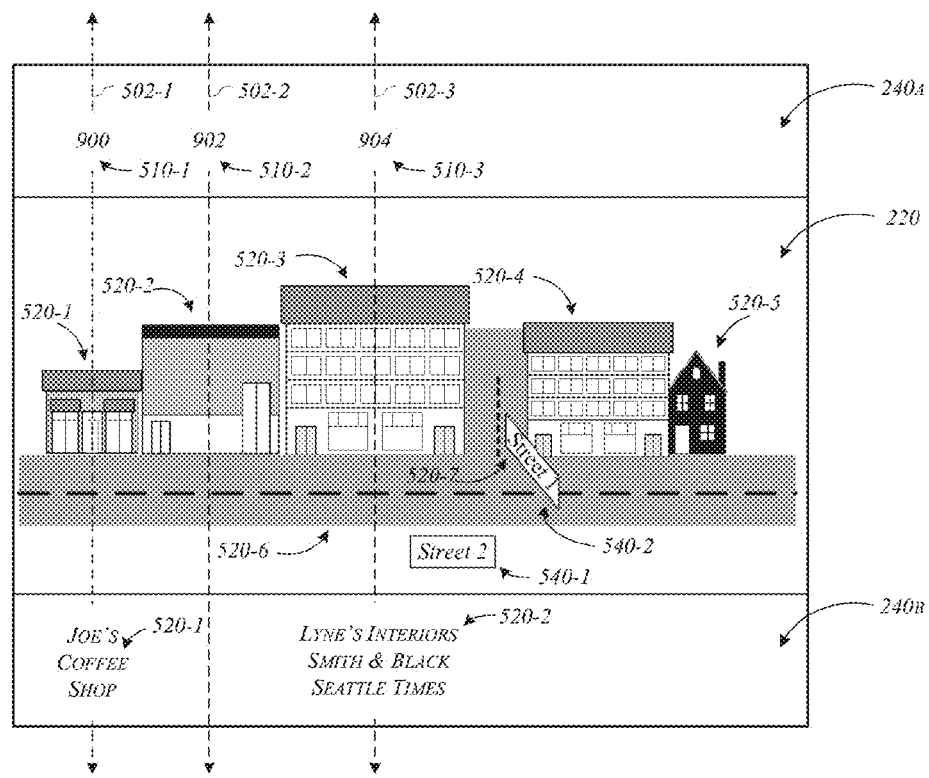
FIG. 5B illustrates an embodiment of a second street view image.

FIG. 5B illustrates an exemplary annotated street view image 120B. Similar to the annotated street view image 120A described with reference to FIG. 5A, the annotated street view image 120B may comprise various parts, including a top horizontal metadata panel 240A, a street view image 220, and a bottom horizontal metadata panel 240B. However, where the annotated street view image 120B illustrates object metadata 510-$b$, 530-$c$ presented only in the respective horizontal metadata panels 240A, 240B, the annotated street view image 120B illustrates a case where object metadata 540-$e$ for certain objects 520-$a$ are also presented within the street view image 120B. For instance, the street view image 220 may include various object metadata 540-1 through 540-2 comprising street names "Street 1" and "Street 2" each corresponding to the respective streets 520-6 and 520-7. The object metadata 540-1, 540-2 may provide more detailed information about the streets 520-6, 520-7 though user interface elements like balloons, hovering display boxes, or signs superimposed directly on the street view image 220. Further, the object metadata 540-1, 540-2 may be presented using a 3D perspective aligning with the streets 520-6, 520-7 to allow a viewer to more quickly orient themselves when navigating between different annotated street view images 120B of the intersecting streets 520-6, 520-7. For instance, animations may be used during transitions of a first annotated street view image 120B showing a horizontal view of the street 520-6 to a second annotated street view image 120B showing a horizontal view of the street 520-7 in response to a viewer navigation between the intersecting streets 520-6, 520-7. The animations may utilize the same 3D perspective positions for the object metadata 540-1, 540-2, and smoothly switch the 3D perspective positions as a viewer navigates from the street 520-6 to the street 520-7, allowing viewing continuity during the transition.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 6 illustrates one embodiment of a logic flow 600. The logic flow 600 may be representative of some or all of the operations executed by one or more embodiments described herein, such as the street level component 110 of the mapping application 100, for example.

In the illustrated embodiment shown in FIG. 6, the logic flow 600 may generate a street view image for a map application at block 602. For example, the street view component 210 may generate a street view image 220 for the map application 100. The street view image 220 may comprise a set of street level images combined together in a single uniform image. The individual street view images may each comprise digital images of a portion of a street, such as streets 520-6, 520-7, captured by a digital camera or digital video camera.

The logic flow 600 may generate a horizontal metadata panel for the street view image at block 604. For example, the metadata component 230 may generate one or both horizontal metadata panels 240A, 240B for the street view image 220. The horizontal metadata panels 240A, 240B may be positioned above and below the street view image 220. The horizontal metadata panels 240A, 240B may each have an edge that is adjacent, contiguous or overlapping with an edge of the street view image 220. The horizontal metadata panels 240A, 240B may each have different a different size, shape or geometry to match a size, shape or geometry of the street view image 220 and available display area of the display 304.

The logic flow 600 may retrieve object metadata for objects shown in the street view image at block 606. For example, the metadata component 230 may retrieve object metadata 510-$b$, 530-$c$ and/or 540-$e$ for various objects 520-$a$ shown in the street view image 220 from the datastore 232. The datastore 232 may be implemented as a local datastore or a remote datastore. The object metadata 510-$b$, 530-$c$ and/or 540-$e$ may comprise any type of information associated with, or descriptive of, a corresponding object 520-$a$. Further, the object metadata 510-$b$, 530-$c$ and/or 540-$e$ may include hyperlinks or other pointers arranged to retrieve additional information related to object metadata 510-$b$, 530-$c$ and/or 540-$e$.

The logic flow 600 may position object metadata in the horizontal metadata panel in approximate vertical alignment with a corresponding object in the street view image at block 608. For example, the metadata component 230 may position object metadata 510-$b$, 530-$c$ and/or 540-$e$ for various objects 520-$a$ in the horizontal metadata panels 240A, 240B in approximate vertical alignment along various axes 502-$d$ with a corresponding object 520-$a$ in the street view image 220.

The logic flow 600 may combine the street view image and the horizontal metadata panel to form an annotated street view image at block 610. For example, the metadata component 230 may combine the street view image 220 and the horizontal metadata panels 240A, 240B to form an annotated street view image 120. The presentation component 130 may present the annotated street view image 120 on the display 304.

Figure 7:
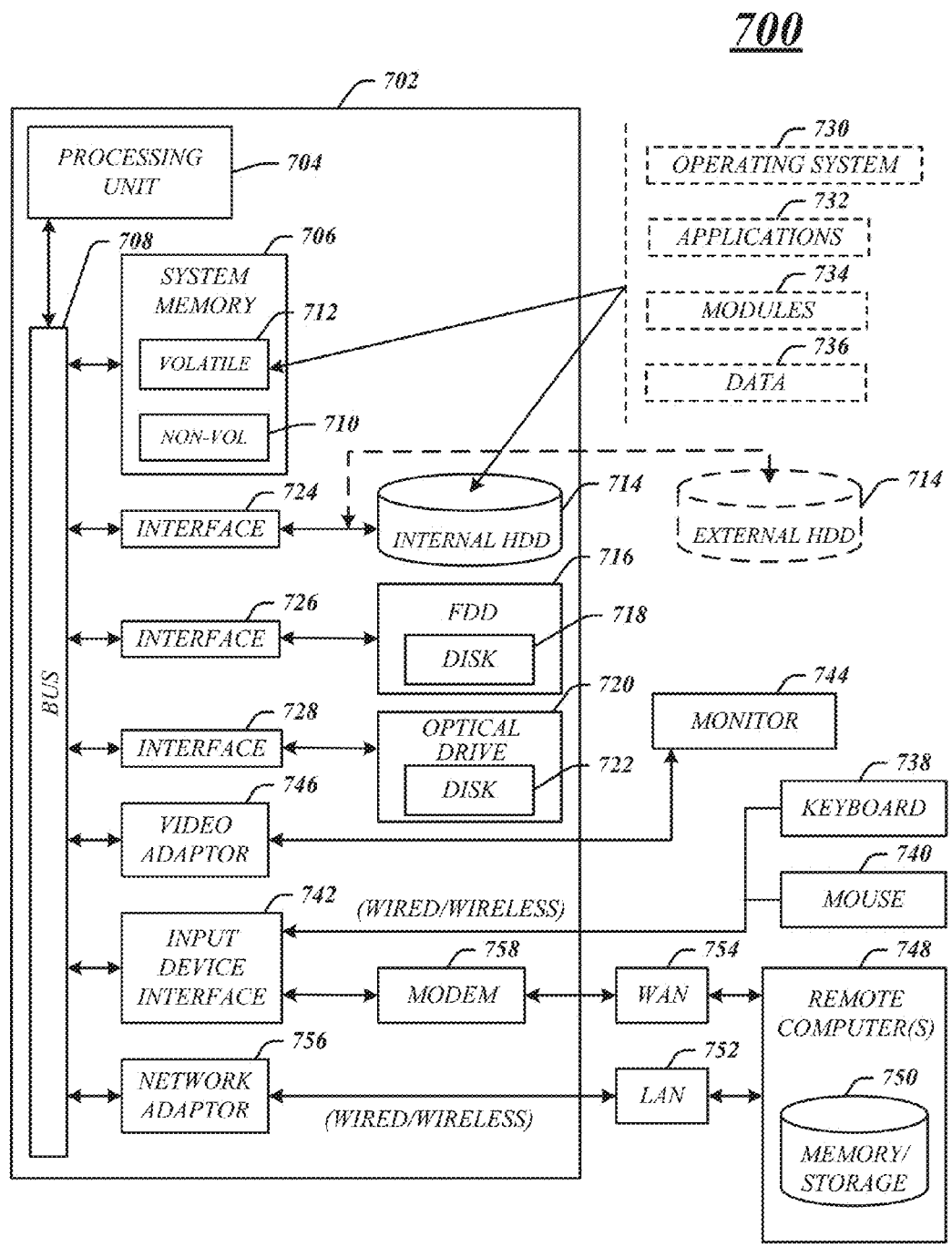
FIG. 7 illustrates an embodiment of a computing architecture.

FIG. 7 illustrates an embodiment of an exemplary computing architecture 700 suitable for implementing various embodiments as previously described. The computing architecture 700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 700.

As shown in FIG. 7, the computing architecture 700 comprises a processing unit 704, a system memory 706 and a system bus 708. The processing unit 704 can be any of various commercially available processors. Dual microprocessors and other multi-processor architectures may also be employed as the processing unit 704. The system bus 708 provides an interface for system components including, but not limited to, the system memory 706 to the processing unit 704. The system bus 708 can be any of several types of bus structure that may further interconnect to a memory bus (with or without a memory controller), a peripheral bus, and a local bus using any of a variety of commercially available bus architectures.

The system memory 706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 7, the system memory 706 can include non-volatile memory 710 and/or volatile memory 712. A basic input/output system (BIOS) can be stored in the non-volatile memory 710.

The computer 702 may include various types of computer-readable storage media, including an internal hard disk drive (HDD) 714, a magnetic floppy disk drive (FDD) 716 to read from or write to a removable magnetic disk 718, and an optical disk drive 720 to read from or write to a removable optical disk 722 (e.g., a CD-ROM or DVD). The HDD 714, FDD 716 and optical disk drive 720 can be connected to the system bus 708 by a HDD interface 724, an FDD interface 726 and an optical drive interface 728, respectively. The HDD interface 724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 710, 712, including an operating system 730, one or more application programs 732, other program modules 734, and program data 736. The one or more application programs 732, other program modules 734, and program data 736 can include, for example, the mapping application 100, the street level component 110, the annotated street view image 120, the presentation component 130, the street view component 210, the street view image 220, the metadata component 230, and the horizontal metadata panel 240.

A user can enter commands and information into the computer 702 through one or more wire/wireless input devices, for example, a keyboard 738 and a pointing device, such as a mouse 740. Other input devices may include a microphone, an infra-red (IR) remote control, a joystick, a game pad, a stylus pen, touch screen, or the like. These and other input devices are often connected to the processing unit 704 through an input device interface 742 that is coupled to the system bus 708, but can be connected by other interfaces such as a parallel port, IEEE 1394 serial port, a game port, a USB port, an IR interface, and so forth.

A monitor 744 or other type of display device is also connected to the system bus 708 via an interface, such as a video adaptor 746. In addition to the monitor 744, a computer typically includes other peripheral output devices, such as speakers, printers, and so forth.

The computer 702 may operate in a networked environment using logical connections via wire and/or wireless communications to one or more remote computers, such as a remote computer 748. The remote computer 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wire/wireless connectivity to a local area network (LAN) 752 and/or larger networks, for example, a wide area network (WAN) 754. Such LAN and WAN networking environments are commonplace in offices and companies, and facilitate enterprise-wide computer networks, such as intranets, all of which may connect to a global communications network, for example, the Internet.

When used in a LAN networking environment, the computer 702 is connected to the LAN 752 through a wire and/or wireless communication network interface or adaptor 756. The adaptor 756 can facilitate wire and/or wireless communications to the LAN 752, which may also include a wireless access point disposed thereon for communicating with the wireless functionality of the adaptor 756.

When used in a WAN networking environment, the computer 702 can include a modem 758, or is connected to a communications server on the WAN 754, or has other means for establishing communications over the WAN 754, such as by way of the Internet. The modem 758, which can be internal or external and a wire and/or wireless device, connects to the system bus 708 via the input device interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 8:
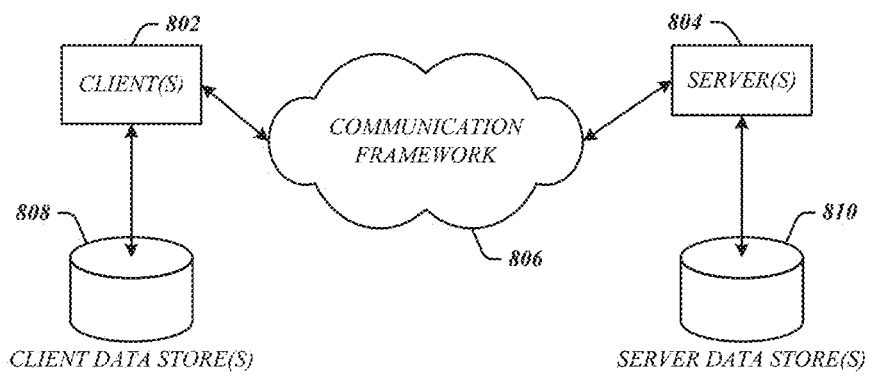
FIG. 8 illustrates an embodiment of a communications architecture.

FIG. 8 illustrates a block diagram of an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, and so forth. The embodiments, however, are not limited to implementation by the communications architecture 800.

As shown in FIG. 8, the communications architecture 800 comprises includes one or more clients 802 and servers 804. The clients 802 may implement the client systems 310, 400. The servers 804 may implement the server system 330. The clients 802 and the servers 804 are operatively connected to one or more respective client data stores 808 and server data stores 810 that can be employed to store information local to the respective clients 802 and servers 804, such as cookies and/or associated contextual information.

The clients 802 and the servers 804 may communicate information between each other using a communication framework 806. The communications framework 806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 802 and the servers 804 may include various types of standard communication elements designed to be interoperable with the communications framework 806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 802 and a server 804 can be in the form of a data packet adapted to be transmitted between two or more computer processes. The data packet may include a cookie and/or associated contextual information, for example.

Various embodiments may be implemented using hardware elements, software elements, or a combination of both. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may comprise an article of manufacture. An article of manufacture may comprise a computer-readable storage medium arranged to store logic. Examples of a computer-readable storage media include any storage medium capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   receiving a request for one or more panoramic views of a street view image;
   generating the panoramic views of the street view image as a multi-level tiled pyramid representation;
   generating a metadata panel for the street view image;
   storing, at a level of the multi-level tiled pyramid representation, object metadata associated with a plurality of objects shown in the street view image;
   positioning the object metadata in the metadata panel in approximate alignment with at least two corresponding objects in the street view image;
   combining the street view image and the metadata panel to form an annotated street view image; and
   communicating, the object metadata associated with the at least two corresponding objects in the street view image before the street view image.

2. The computer-implemented method of claim 1, comprising:
   receiving a request for a street level view of a location at a server device;
   retrieving street level images for the location from a map database; and
   combining the street level images to form the street view image.

3. The computer-implemented method of claim 1, comprising generating the metadata panel adjacent to the street view image.

4. The computer-implemented method of claim 1, comprising generating the metadata panel contiguous with the street view image.

5. The computer-implemented method of claim 1, comprising generating the metadata panel overlapping with the street view image.

6. The computer-implemented method of claim 1, comprising generating a top metadata panel for the street view image, the top metadata panel positioned above a top portion of the street view image.

7. The computer-implemented method of claim 1, comprising generating a bottom metadata panel for the street view image, the bottom metadata panel positioned below a bottom portion of the street view image.

8. The computer-implemented method of claim 1, comprising positioning object metadata comprising navigation information in the street view image proximate to a corresponding object in the street view image.

9. The computer-implemented method of claim 1, comprising
sending the annotated street view image to a client device for presentation by the client device.

10. An article comprising storage hardware containing instructions that when executed enable a system to:
send a request for a street level view of a location, wherein a street view image includes at least a portion of a street;
receive one or more panoramic views of a street view image as a multi-level tiled pyramid representation where object metadata is stored in a level of the multi-level tiled pyramid representation and is associated with at least two corresponding objects in the street view image; and
present, based upon network-based delays, the street view image and a metadata panel on display hardware, the metadata panel having the object metadata positioned in approximate alignment with the at least two corresponding objects wherein the object metadata associated with the at least two corresponding objects in the street view image is presented before the street view image is presented.

11. The article of claim 10, further comprising instructions that when executed enable the system to receive a control directive indicating that the user has rotated the client device and render an alternative street view image based on the control directive indicating a rotation of client device, wherein the alternate street view image corresponds to moving up or down the street.

12. The article of claim 10, further comprising instructions that when executed enable the system to present the metadata panel adjacent to the street view image, contiguous with the street view image, or overlapping with the street view image.

13. The article of claim 10, further comprising instructions that when executed enable the system to present a top metadata panel for the street view image, the top metadata panel positioned above a top portion of the street view image.

14. The article of claim 10, further comprising instructions that when executed enable the system to present a bottom metadata panel for the street view image, the bottom metadata panel positioned below a bottom portion of the street view image.

15. An apparatus, comprising:
a processor; and
a memory coupled to the processor, the memory storing a mapping application having a street level component that when executed by the processor is operative to generate annotated street view images of a location, the street level component comprising:
a street view component operative to:
generate a street view image from temporary supplemental views of the location in response to network-based delays, the street view image having one or more objects located within the street view image, wherein the street view image includes at least a portion of a street;
receive input from an integrated camera that indicates user head Motion; and
generate an alternative street view image that moves the street view image parallel to the user head motion and shows the portion of the street from a different angle or shows a different portion of the street; and
a metadata component communicatively coupled to the street view component, the metadata component operative to generate a metadata panel having object metadata positioned in approximate alignment with at least two corresponding objects in the street view image, and combine the metadata panel with the street view image to form an annotated street view image.

16. The apparatus of claim 15, the metadata component operative to position the metadata panel adjacent to the street view image, contiguous with the street view image, or overlapping with the street view image.

17. The apparatus of claim 15, the metadata component operative to generate a top metadata panel for the street view image, the top metadata panel positioned above a top portion of the street view image.

18. The apparatus of claim 15, the metadata component operative to generate a bottom metadata panel for the street view image, the bottom metadata panel positioned below a bottom portion of the street view image.

19. The apparatus of claim 15, comprising a datastore arranged to store object metadata indexed by a corresponding object.

20. The apparatus of claim 15, the object metadata comprising information for a corresponding object in located within the street view image, including location information, business information, personal information, event information, social networking information, advertising information, or navigation information.

* * * * *